(12) United States Patent
Nokkonen (10) Patent No.: US 7,383,449 B2
(45) Date of Patent: Jun. 3, 2008

(54) POWER MANAGEMENT FOR CONNECTED CIRCUITS

(75) Inventor: Erkki Nokkonen, Tampere (FI)

(73) Assignee: Nokia Siemens Networks Oy, Espoo (FI)

( * ) Notice: Subject to any disclaimer, the term of this patent is extended or adjusted under 35 U.S.C. 154(b) by 280 days.

(21) Appl. No.: 11/002,002

(22) Filed: Dec. 1, 2004

(65) Prior Publication Data
US 2006/0117192 A1 Jun. 1, 2006

(51) Int. Cl.
*G06F 1/00* (2006.01)
*G06F 1/26* (2006.01)
*G06F 1/32* (2006.01)

(52) U.S. Cl. .................. 713/300; 713/320; 713/330

(58) Field of Classification Search ............... 713/300, 713/320, 330
See application file for complete search history.

(56) References Cited

U.S. PATENT DOCUMENTS

| | | | | |
|---|---|---|---|---|
| 5,196,728 A | * | 3/1993 | Jaux .......................... 307/10.1 |
| 5,378,935 A | * | 1/1995 | Korhonen et al. ........... 327/114 |
| 5,815,409 A | * | 9/1998 | Lee et al. .................... 700/286 |
| 6,345,362 B1 | * | 2/2002 | Bertin et al. ................. 713/300 |
| 6,924,607 B2 | * | 8/2005 | Cash et al. .................. 315/307 |
| 2005/0102544 A1 | * | 5/2005 | Brewer et al. .............. 713/320 |
| 2005/0114716 A1 | * | 5/2005 | O .............................. 713/300 |
| 2006/0085654 A1 | * | 4/2006 | Nokkonen ................... 713/300 |

* cited by examiner

*Primary Examiner*—Thomas Lee
*Assistant Examiner*—Ji H Bae (57) ABSTRACT

Each of at least two power management (PM) circuits interconnected by a signal line is adapted to control a power supply to at least one functional component associated to the power management circuit. Each PM circuit is adapted to detect a condition which allows or requires a change of a powering state of the at least one associated functional component and to contribute to a change of a state of the signal line, in case the PM circuit detects a condition which allows or requires, respectively, a change of a powering state of the at least one associated functional component. Each PM circuit is adapted to monitor a state of the signal line. Each PM circuit is adapted to change a powering state of all associated functional components upon detection of a change of state of the signal line.

24 Claims, 6 Drawing Sheets

Master and slave PM ICs

POWER MANAGEMENT FOR CONNECTED CIRCUITS

FIELD OF THE INVENTION

The invention relates to an electronic device comprising at least two power management circuits. The invention relates equally to a corresponding power management circuit, to a chip comprising such a power management circuit and to a method of operating such an electronic device.

BACKGROUND OF THE INVENTION

A power management circuit is a circuit which controls the power supply to at least one functional component of an electronic device. If a device comprises a plurality of functional components, a dedicated power management circuit may be associated to each of these functional components.

For example, a cellular terminal usually comprises a cellular modem as a first functional component, an application engine as a second functional component, etc. The term application engine refers to the "motor" of a terminal. It may comprise the application processor and related memory components, including the core software, hardware drivers, low level software and operating system, as well as related power management components and interfaces to peripherals like display, camera, keyboard, Bluetooth™ module, etc., even to the cellular modem. The application engine does not contain the mentioned peripherals, though. The idea behind the use of such an application engine is that it allows constructing many kinds of terminals using the same core components but varying for example the user interfaces, like display and keyboard. In general, it enables the construction of products that look quite different and have different features but that use the same technology inside.

Each of the functional components may be realized for instance on a separate chip, and each chip may comprise a power management circuit. Each power management circuit can be realized for instance in the form of an Integrated Circuit (IC) or an Application Specific Integrated Circuit (ASIC).

In case a plurality of power management circuits are present in a device, one of the circuits is normally defined to be a master circuit, while the other circuits are defined to be slave circuits. The master circuit controls the power-up and down of the entire system. This can be realized with an enable signal which is controlled by the master circuit and which can be detected by the slave circuits. Whenever the enable signal becomes active, the slave circuits cause the associated functional components to be powered up, and whenever the enable signal becomes inactive, the slave circuits cause the associated functional components to be powered down.

One criterion which is taken into account when controlling the powering state of an electronic device is the voltage level of a battery providing the device with a power supply. Normally, inserting a battery with a sufficiently high voltage into a device like a mobile phone causes the system to power up, even though this might not be visible to a user. Similarly, the system is powered up when the battery is empty, in case a charger is connected to the device and the battery voltage rises again to a sufficient level.

Typically, each power management circuit of an electronic device has its own battery voltage monitoring circuitry. The battery voltage monitoring circuitry monitors whether a sufficiently high battery voltage is available for regulators and other integrated components of the respective power management circuit.

Such battery voltage monitoring circuitry is frequently a comparator using hysteresis. When a higher power-up threshold is exceeded by the battery voltage, the associated functional components are powered up. When the battery voltage falls below a lower cut-off threshold, the associated functional components are shut down. With such a hysteresis, repeated power ups and shutdowns in an on/off oscillation can be avoided, even in case the battery voltage is close to a power-up threshold and varies for example due to a changing load.

For each power management circuit, the cut-off threshold has to be somewhat higher than the respectively highest output voltage of a linear regulator, in order to guarantee a proper voltage regulation. The cut-off threshold can be for instance about 100 to 200 mV higher than the highest regulator output voltage. By way of example, the nominal battery voltage could be 3.6 V and the highest regulated voltage could be 2.5 V. The power-up threshold could then be 3.1 V+/−100 mV, while the cut-off threshold could be 2.8 V+/−100 mV.

In order to avoid that some power management circuits shut down their associated functional components while other power management circuits are still powered up, all power management circuits could be designed to have the same cut-off threshold. But even if the cut-off thresholds are selected to be the same in all power management circuits, each power management circuit will still have a slightly different threshold due to an inherent inaccuracy. As a consequence, a controlled shut down is a problem. A corresponding problem arises when the system is starting up due to a battery voltage rising above the power-up threshold.

In a system with multiple power management circuits, the master power management circuit therefore usually also takes care of the battery voltage monitoring.

The battery value thresholds in all power management circuits have to be selected to this end such that the master power management circuit has the highest power-up threshold and the highest cut-off threshold. This guarantees that, when the master power management circuit powers up and activates the enable signal, all other power management circuits are already ready to operate. Similarly, this guarantees that the master power management circuit shuts down first and deactivates the enable signal, before any slave power management circuit starts to power off it associated functional components.

It is a disadvantage of such a system, though, that power management circuits having virtually the same battery voltage thresholds cannot be used as a master power management circuit and as a slave power management circuit within a single electronic device. Further, the cut-off threshold of the master power management circuit has to be unnecessarily high, in order to guarantee an appropriate voltage regulation in the slave devices. Thus, an efficient exploitation of the available battery capacity is prevented. Further, it is not possible to use any power management circuit as the master power management circuit. If the power management circuits are realized as ICs, the master power management circuit has to be fixed before the IC design freezes. Moreover, it is not possible, to use a slave power management circuit alone or as a master power management circuit, as the cut-off threshold might be too low for a voltage regulation.

SUMMARY OF THE INVENTION

It is an object of the invention to improve the power management in an electronic device.

An electronic device is proposed which comprises at least two power management circuits and a signal line connecting the at least two power management circuits. Each of the at least two power management circuits is adapted to control a power supply to at least one functional component of the electronic device associated to this power management circuit. Each of the at least two power management circuits is further adapted to detect at least one of a condition which allows a change of a powering state of the at least one functional component associated to this power management circuit and a condition which requires a change of a powering state of the at least one functional component associated to this power management circuit. Each of the at least two power management circuits is further adapted to contribute to a change of a state of the signal line, in case the power management circuit detects a condition which allows or requires, respectively, a change of a powering state of the at least one functional component associated to the power management circuit. Each of the at least two power management circuits is further adapted to monitor a state of the signal line. Each of the at least two power management circuits is further adapted to change a powering state of all functional components associated to it upon detection of a change of state of the signal line.

Moreover, a power management circuit is proposed which comprises a signal line terminal enabling a connection to a signal line and a power supply terminal enabling a control of a power supply to at least one functional component associated to the power management circuit. The power management circuit is adapted to detect at least one of a condition which allows a change of a powering state of the at least one functional component and a condition which requires a change of a powering state of the at least one functional component. The power management circuit is further adapted to contribute to a change of a state of a signal line connected to the signal line terminal, in case the power management circuit detects a condition which allows or requires, respectively, a change of a powering state of the at least one functional component. The power management circuit is further adapted to monitor a state of a signal line connected to the signal line terminal. The power management circuit is further adapted to change a powering state of the functional components upon detection of a change of state of a signal line connected to the signal line terminal.

Moreover, a chip is proposed, which comprises at least one functional component and the proposed power management circuit.

Moreover, a method for operating an electronic device comprising at least two power management circuits and a signal line interconnecting the at least two power management circuits is proposed. At least one functional component of the electronic device is associated to each of the at least two power management circuits, and each of the at least two power management circuits is adapted to control a power supply to the at least one associated functional component. The method comprises at one of the at least two power management circuits monitoring a state of the signal line. The method further comprises monitoring an entry of at least one of a condition which allows a change of a powering state of the at least one functional component associated to the power management circuit and a condition which requires a change of a powering state of the at least one functional component associated to the power management circuit. The method further comprises contributing to a change of a state of the signal line, in case a condition which allows or requires, respectively, a change of a powering state of the at least one functional component associated to the power management circuit is detected. The method further comprises changing a powering state of the at least one functional component associated to the power management circuit upon detection of a change of state of the signal line.

The invention is based on the idea that each of a plurality of power management circuits of an electronic device could have a direct influence on the powering state of the device. In contrast to known solutions, any power management circuit, including a slave power management circuit, can thus directly influence a signal on a signal line, which indicates for all power management circuits, including a master power management circuit, whether associated functional components are to be powered up or powered down.

It is an advantage of the invention that a direct control is faster and does not rely on other components. It is further an advantage of the invention that it is easy to extend the system by adding another power management circuit. Further, it does not require additional connection pins on the circuits.

It is equally an advantage of the invention that with a direct control by all power management circuits, the conditions which are checked in the plurality of power management circuits do not have to be adjusted to each other in order to ensure a proper order in which they are detected in the power management circuits. Thus, two or more power management circuits can be employed which are basically the same.

While the indicated advantages of the invention are achieved when a plurality of power management circuits are employed in an electronic device, it is to be understood that the proposed power management circuit can be used nevertheless as the only power management circuit of an electronic device.

In one embodiment of the invention, the plurality of power management circuits comprise one master power management circuit and at least one slave power management circuit, where the master power management circuit is able to control any slave power management circuit for powering the electronic device up and down in a regular manner in regular situations. The master power management circuit may be for example the only power management circuit that is being controlled by software to handle a regular power down procedure. The proposed supervision of conditions is only employed for special situations, which may be taken into account as well in the regular situations, though. Such regular situations may be for example a powering up when a user presses an ON/OFF key or in case of a charger connection, or a shut-down of the system due to a request by system software. A master power management circuit may also control a power up reset signal. In another embodiment of the invention, however, the plurality of power management circuits may comprise as well a plurality of power management circuits of the same status. It is to be understood that an electronic device may further comprise at least one power management circuit which is not capable of monitoring an entry of a condition itself, and which is thus not required to be able to change the state of the signal line. Such a power management circuit will simply follow the commands on the signal line.

In one embodiment of the invention, a condition which allows a change of a powering state of the at least one functional component associated to a power management circuit comprises a condition which allows powering up the at least one functional component. The power management circuits are adapted to change a state of the signal line to cause the at least two power management circuits to power up their associated functional components, in case each of the at least two power management circuits detects a condition which allows powering up associated functional components. That is, the state of the signal line will only indicate that all functional components are to be powered up, in case all power management circuits agree that a condition is met. As long as one or more of the power management circuits considers the condition not to be met, the state of the signal line cannot indicate a powering up of the functional components.

In a further embodiment of the invention, a condition which requires a change of a powering state of the at least one functional component associated to a power management circuit comprises a condition which requires powering down the at least one functional component. Each of the power management circuits are adapted to change a state of the signal line to cause the power management circuits to power down their associated functional components, in case at least one of the at least two power management circuits detects a condition which requires a powering down of the at least one associated functional component. That is, the state of the signal line will indicate that all functional components are to be powered down, as soon as this is considered necessary by a single one of the power management circuits.

With relation to the condition which is monitored, there is thus no longer a single master power management circuit controlling the powering state of the electronic device. The control is rather performed collectively by all power management circuits.

In case the electronic device comprises a battery providing a supply voltage, a condition which allows powering up the at least one functional component associated to a power management circuit may be a battery voltage exceeding a power-up threshold associated to this power management circuit. The system will only be powered up in case the highest power-up threshold defined in the electronic device is exceeded. Similarly, a condition which requires powering down the at least one functional component associated to a power management circuit may comprise a battery voltage falling short of a cut-off threshold associated to this power management circuit. The system will be powered down as soon as the highest cut-off threshold defined in the electronic device is not reached anymore.

In case the battery voltage is monitored, the invention has the advantage that two or more power management circuits with same voltage limits can be used. That is, it is no longer required that a master circuit is set to require a higher power supply than the slave circuits. The voltage thresholds can be chosen freely for each power management circuit. As a consequence, a high flexibility is achieved and the battery capacity can be utilized more efficiently. The latter results in a longer operating time of the electronic device.

Alternatively or in addition to battery voltage thresholds, other conditions may be monitored as well by all power management circuits in order to influence the state of the signal line. Typically, any power management circuit comprises a thermal shut-down function. That is, in case the temperature of an associated functional component or of a chip comprising the associated functional component rises too high, the power management circuit forces the component to power off, in order to prevent a destruction of the component. According to the invention, each power management circuit detecting a critical temperature causes in addition the signal line to adapt a state which causes any other power management circuit to power off its associated functional components. Various other conditions can be monitored as well, for example other emergency conditions.

The states of the signal line may comprise for example an active state and an inactive state, corresponding for instance to a high voltage on the signal line and a low voltage or the absence of a voltage.

According to the invention, any of the power management circuits of an electronic device is able to contribute to a change of the state of the signal line. In one embodiment of the invention, the signal line is arranged to this end to carry an open drain type of signal which can be activated by any of the power management circuits.

In one embodiment of the invention, a respective "pull-up" resistor is associated to at least one of the power management circuits. Each of the power management circuits to which a pull-up resistor is associated is adapted to enable an active high voltage state of the signal line by switching an associated pull-up resistor between a power supply and the signal line. Only when at least one of the "pull-up" resistors is switched between power supply and signal line, a voltage may be present on the signal line. This avoids an extra current consumption while the electronic device is in a power-off mode. In case a pull-up resistor is associated to each power management circuit, this has the advantage that any of the power management circuits can be used as a master circuit.

In one embodiment of the invention, all power management circuits may comprise a switching element, like a transistor. The signal line may then be connected via the respective switching element to ground. A power management circuit may then change a state of the signal line from an active high voltage state to an inactive low voltage state by closing the switching element, for example by making a non-conductive transistor conductive by applying a suitable gate voltage.

In one embodiment of the invention, a state machine is implemented in a master power management circuit. This state machine may ensure that the master power management circuit is able to perform a regular control of the powering state of the functional components of the electronic device in all operating modes.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
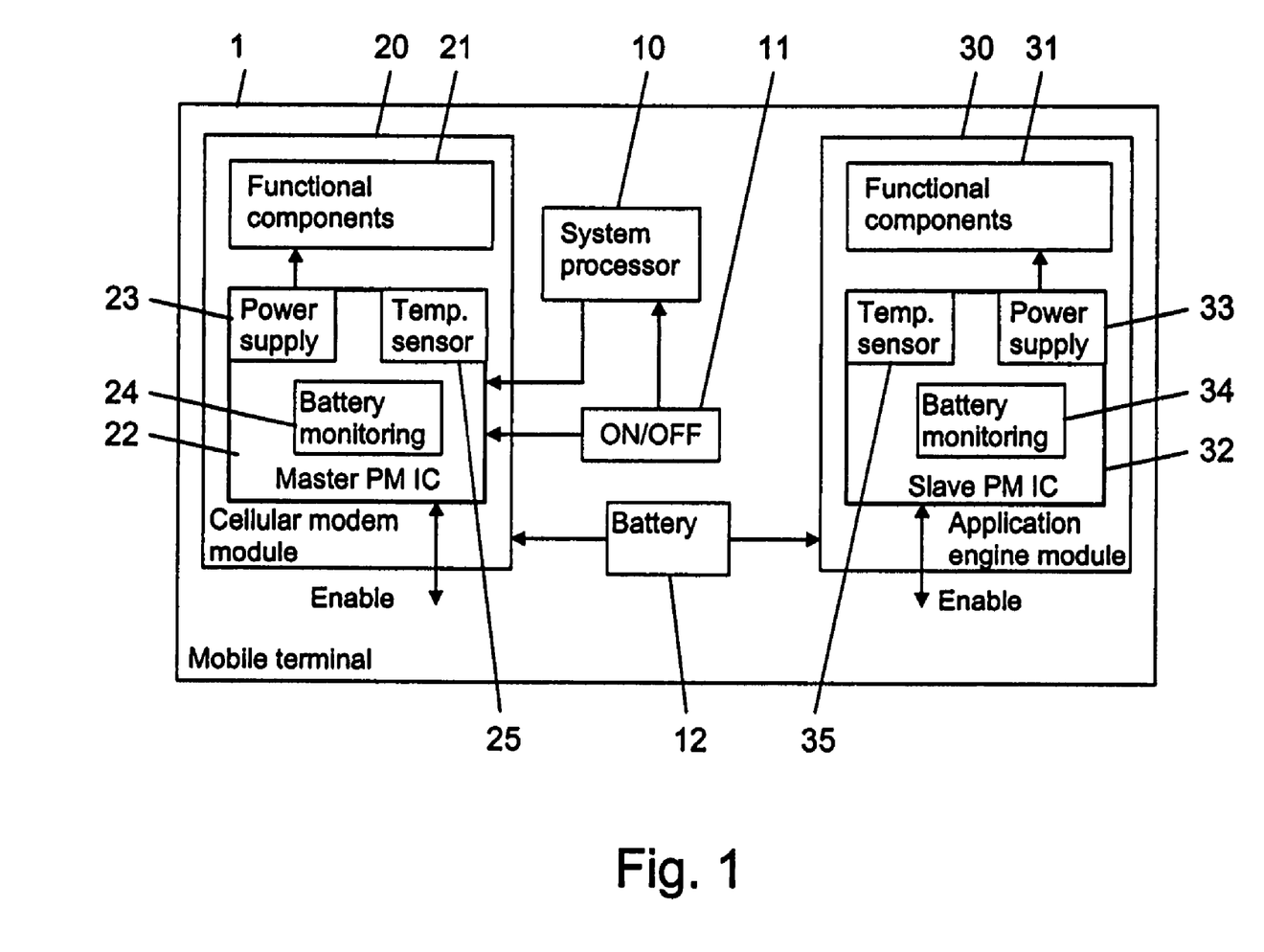
FIG. 1 is a schematic block diagram of an electronic device in which the invention can be implemented.

FIG. 1 is a schematic block diagram of a mobile terminal 1, which enables a flexible implementation of power management circuits in accordance with an embodiment of the invention. It is to be understood that the invention can equally be implemented in any other electronic device comprising a plurality of power management circuits.

The mobile terminal 1 includes at least one system processor 10, which runs software for coordinating the operations in the mobile terminal 1. The mobile terminal 1 further comprises an ON/OFF button 11 and a battery 12 providing the power supply for the mobile terminal 1.

The mobile terminal 1 further includes a cellular modem module 20. The cellular modem module 20 comprises functional components 21 for a cellular modem integrated on a chip, including for example a processor, an RF module and memory components. In addition, the cellular modem module 20 comprises a master power management (PM) IC 22. The master PM IC 22 comprises a power supply unit 23 for the functional components 21, a battery voltage monitoring circuit 24, a temperature sensor 25 and additional circuitry (not shown). The master PM IC 22 controls on the one hand the power supply to the functional components 21. The power supply unit 23 includes to this end at least one regulator, which is adapted to provide a required voltage level to the functional components 21. On the other hand, the master PM IC 22 controls any power-up and power-down of the entire mobile terminal 1 in accordance with commands provided by the system processor 10 or by a user via the ON/OFF button 11.

The system processor 10 is connected to the master PM IC 22. It has to be noted that the system processor 10 could also be part of the cellular modem module 20. The ON/OFF button 11 is connected to an input of the master PM IC 22 and possibly also to the system processor 10.

The mobile terminal 1 moreover includes an application engine module 30. The application engine module 30 comprises functional components 31 for an application engine integrated on a chip, for example an application engine processor controlling various peripherals and a memory. The application engine module 30 moreover comprises a slave PM IC 32. The slave PM IC 32 comprises a power supply unit 33 for the functional components 31, a battery voltage monitoring circuit 34, a temperature sensor 35 and additional circuitry (not shown). The slave PM IC 32 controls the power supply to the functional components 31. The power supply unit 33 includes to this end at least one regulator, which is adapted to provide a required voltage level to the functional components 31.

It has to be noted that even though not indicated in FIG. 1, the PM IC 22 of the cellular modem module 20 and the PM IC 32 of the application engine module 30 might share some components, for example one or more regulators. Further, it has to be noted that in one of a plurality of alternative embodiments, the PM IC 32 of the application engine module 30 could function as a master PM IC and the PM IC 22 of the cellular modem module 20 could function as a slave PM IC.

The mobile terminal 1 may comprises in addition a plurality of other functional components to which a respective slave PM IC including a battery voltage monitoring circuit is associated.

It is to be understood that other power management circuits than ICs could be employed as well, for instance PM ASICs.

The battery 12 is connected to each PM IC of the mobile terminal 1.

It is to be understood that the mobile terminal 1 comprises various other components of a conventional mobile terminal, like a display and an audio transducer, etc., which are not depicted in FIG. 1.

Each of the battery voltage monitoring circuits 24, 34 is able to detect whether the voltage provided by the battery 12 exceeds a respective higher power-up threshold or falls below a respective lower cut-off threshold. The power-up threshold defines a limit above which the battery provides a sufficiently high voltage for supplying the respectively associated functional components 21, 31. The cut-off threshold defines a limit below which a sufficiently high voltage for supplying the respectively associated functional components 21, 31 cannot be guaranteed.

Each of the temperature sensors 25, 35 is able to detect whether a temperature in its environment exceeds a first or a second predetermined limit. The first, lower limit is a warning limit indicating that the temperature is approaching a critical value. The second, higher limit is a shut-down limit indicating that the temperature has actually reached a critical value.

Each of the PM ICs 22, 32 is able to read a commonly available enable signal, to support an activation of the enable signal, and to deactivate the enable signal, as will be explained in the following with reference to FIGS. 2 to 5.

Figure 2:
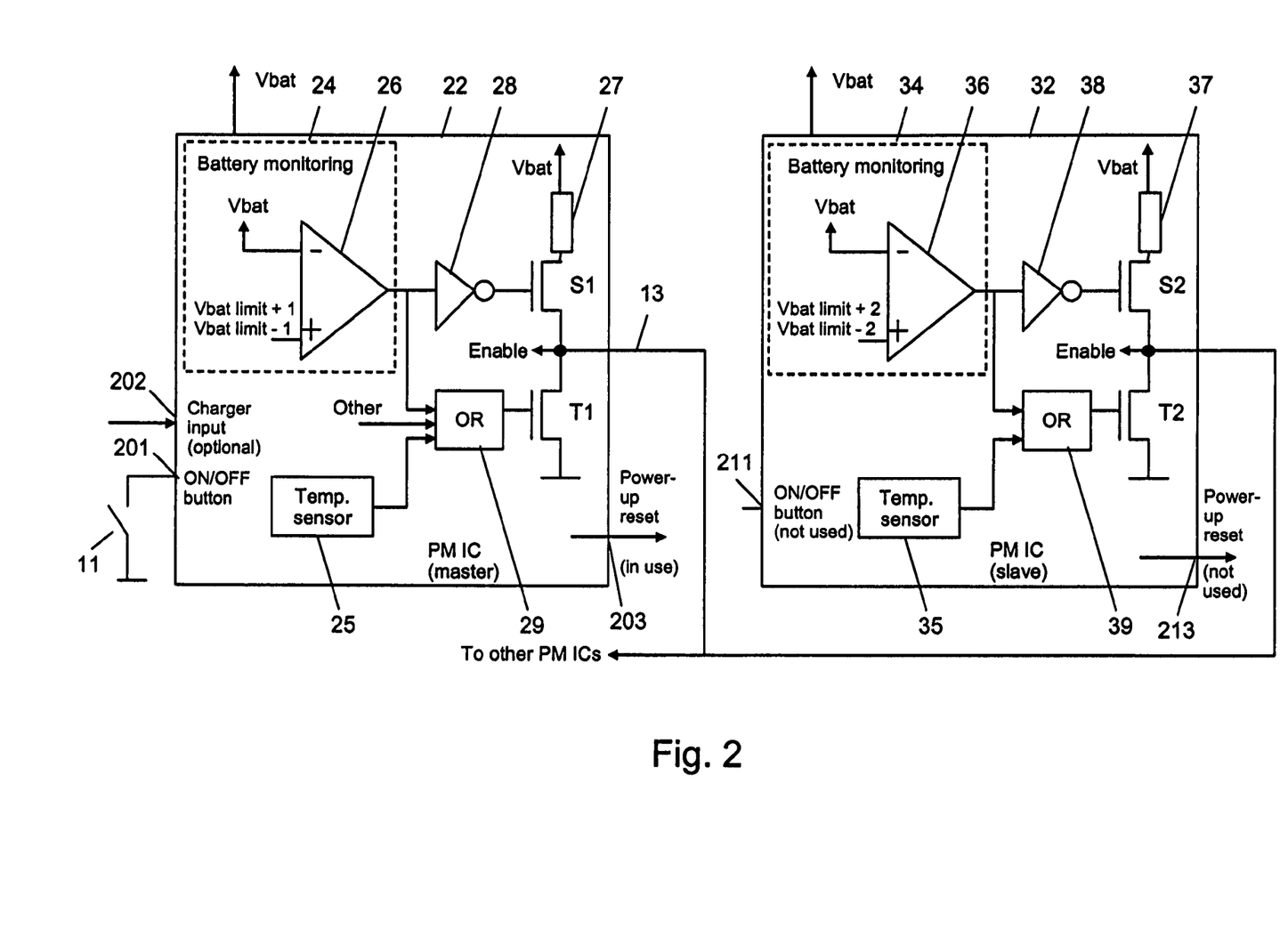
FIG. 2 is a schematic diagram showing details of the electronic device of FIG. 1 in accordance with an embodiment of the invention.

FIG. 2 is a schematic diagram illustrating details of the PM ICs 22, 32 and their interconnection.

The master PM IC 22, the slave PM IC 32 and any other slave PM IC which may be present in the mobile terminal 1 are connected to each other via a signal line 13.

The battery voltage monitoring circuit 24, 34 of each PM IC 22, 32 comprises a comparator 26, 36, which receives as a first input the battery voltage Vbat and as a second input a fixed higher power-up threshold "Vbat limit +" and a fixed lower cut-off threshold "Vbat limit −". The thresholds may be set to different values for each PM IC 22, 32 and are thus provided with numeral 1 for the master PM IC 22 and with numeral 2 for the slave PM IC 32.

Each of the PM ICs 22, 32 further comprises a pull-up resistor 27, 37 which is connected on the one hand to the battery voltage Vbat and on the other hand to a first terminal of a switch S1, S2. The other terminal of the switch S1, S2 is connected to the drain of an n-type CMOS pull-down transistor T1, T2 to ground. The drain of the pull-down transistor T1, T2 is further connected to the signal line 13 and the source of the pull-down transistor T1, T2 is connected to ground GND.

The output of the comparator 26, 36 and thus of the battery voltage monitoring circuit 24, 34 is connected via an inverting component 28, 38 to a control input of the switch S1, S2. The switch S1, S2 is depicted as another n-type CMOS transistor, with the drain connected to the battery voltage and the source connected to pull-down transistor T1, T2. In this constellation, the output of the inverting component 28, 38 is connected to the gate of this other transistor.

The output of the comparator 26, 36 and thus of the battery voltage monitoring circuit 24, 34 is further connected via an OR gate 29, 39 to the gate of the pull-down transistor T1, T2. The OR gate 29, 39 may apply a shut-down signal to the gate of the pull-down transistor T1, T2.

The temperature sensor 25, 35 provides a further input of the OR gate 29, 39. Equally, any other possibly provided sensor provides a further input of the OR gate 29, 39.

It is to be understood that the each of the PM ICs 22, 32 may comprise further units monitoring a particular condition which should cause a powering up or a powering down of the mobile terminal 1, and which thus provide a similar input to the OR gate 29, 39 and/or which are able to control the switch S1, S2.

The signal line 13 is arranged within each PM IC 22, 32 to provide an enable and shut-down signal to the power supply unit 23, 33 (not shown in FIG. 2).

The ON/OFF button 11 of the mobile terminal 1 is connected directly to an input 201 of the master PM IC 22. The slave PM IC 32 may include a corresponding input 211, which is simply not used.

In addition, a charger may be connected to an input 202 of the master PM IC 22.

Within the master PM IC 22, a third input to the OR gate 29 is provided, which may be connected to an additional power control unit (not shown) of the PM IC 22. Such an additional power control unit may comprise for example a state machine which is used in a regular powering down of the electronic device. To this additional power control unit, also the ON/OFF button 11 input 201 and an output of the system processor 10 are connected. Also the charger detection input 202 could be connected to this power control unit. The OR gate 39 of the slave PM IC 32 may include a corresponding third input, which is simply not used.

The master PM IC 22 further comprises an output 203 for a power-up reset signal. The slave PM IC 32 may comprise a corresponding output 213, which is simply not used.

It is to be understood that besides the depicted details, the PM ICs 22,32 may be implemented in the same manner as well-known conventional master and slave PM ICs.

As long as a high level control signal is applied to the switch S1, S2 of any one of the PM ICs 22, 32, the voltage battery Vbat is connected via this switch S1, S2 and the pull-up resistors 27, 37 to the signal line 13. The level of the applied control signal is determined by the respective battery voltage monitoring circuit 24, 34. The comparator 26, 36 of the battery voltage monitoring circuit 24, 34 compares the battery voltage Vbat in a hysteresis with both fixed thresholds. If the battery voltage Vbat rises above the fixed power-up threshold, the comparator 26, 36 outputs a low level signal, which is inverted by the inverter 28, 38 and applied to the switch S1, S2. The switch S1, S2 is closed thereupon. If the battery voltage Vbat falls below the fixed cut-off threshold, in contrast, the comparator 26, 36 outputs a high level signal, which is inverted by the inverter 28, 38 and applied to the switch S1, S2. The switch S1, S2 is opened thereupon.

As long as a low level control signal is applied to the gate of the pull-down transistors T1, T2 of all of the PM ICs 22, 32, the signal line 13 is moreover disconnected from ground GND. But as soon as a high level control signal is applied to the gate of the pull-down transistor T1, T2 of any one of the PM ICs 22, 32, this pull-down transistor T1, T2 forms a conductive connection between the signal line 13 and ground GND. A high level control signal is applied by an OR gate 29, 39 to the gate of a pull-down transistor T1, T2 when the OR gate 29, 39 receives a high level signal at either of its inputs. This may be the case when the comparator 26, 36 outputs a high level signal because the battery voltage Vbat fell below the fixed cut-off threshold or when the temperature sensor 25, 35 outputs a high level signal because the temperature was detected to have risen above an acceptable limit. In the master PM IC 22, a high level signal may further be applied to an input of the OR gate 29 by the additional power control unit, for instance because a user pressed the ON/OFF button 11 for switching the mobile terminal 1 off.

Thus, a high voltage on the signal line 13, representing an active enable signal, is achieved when at least one switch S1, S2 is closed and at the same time none of the pull-down transistors T1, T2 is conductive. The high voltage corresponds approximately to the voltage level Vbat of the battery 12.

In all other cases, there is either no voltage or only a low voltage of the signal line 13, representing an inactive enable signal. No voltage is present, when none of the switches S1, S2 is closed or when no battery voltage is provided, while a low voltage is achieved when at least one of the switches S1, S2 is closed, but at least one of the pull-down transistors T1, T2 is conductive.

Whenever the enable signal is deactivated, the power supply unit 23, 33 of all PM ICs 22, 32 causes a powering down of the respectively associated functional components 21, 31.

The power control in the mobile terminal 1 of FIG. 1 will now be described in more detail with reference to FIGS. 3 to 6.

When the mobile terminal 1 is in a powered down state, this may have been due to different reasons.

The mobile terminal 1 may have been powered down in a regular manner caused by the software of the system processor 10, for example because the user pressed the ON/OFF button 11 for switching the mobile terminal 1 off. In this case, the switch S1, S2 is closed in all PM ICs 22, 32 and the pull-down transistor T2 is not conductive in any of the slave PM ICs 32, as the battery voltage is sufficiently high. The master PM IC 22, though, makes and keeps its pull-down transistor T1 conductive, in order to avoid that the system powers up because the enable signal becomes active due to the closed switches S1, S2. It is the task of a state machine in the master PM IC 22 to take care that the enable signal becomes active only if appropriate.

Further, the system may have been powered down because the battery voltage dropped below the cut-off threshold set for at least one of the PM ICs 22, 32. In this case, a switch S1, S2 is open and a pull-down transistor T1, T2 is conducting in at least one of the PM ICs 22, 32.

Figure 3:
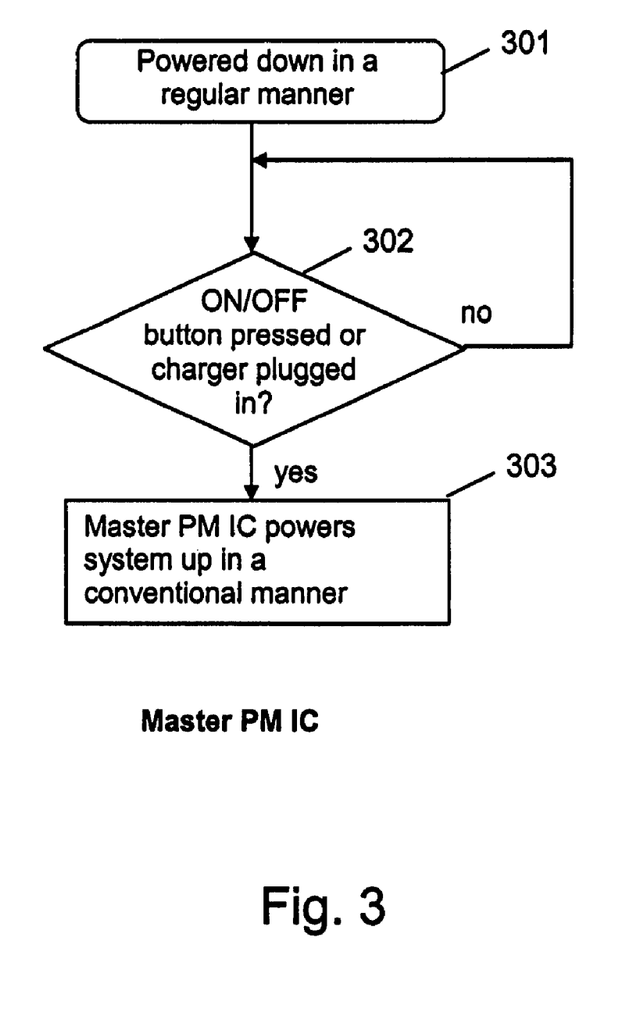
FIG. 3 is a flow chart illustrating operations in the electronic device of FIG. 1 when it is powered down in a regular manner.

FIG. 3 is a flow chart illustrating the operation at the master PM IC 22 in case the mobile terminal 1 has been powered down in a regular manner (step 301).

If the mobile terminal 1 had been powered down in a regular manner, only a regular power up command from the system resulting from a user action, that is a pressing of the ON/OFF button 11, and some other mechanisms, can power the system up again. Such another mechanism may be detecting a plugging in of a charger, which is normally implemented to be equal to pressing the ON/OFF button, if a mobile terminal 1 has been powered off in a regular manner while the battery voltage is still over the highest cut-off limit. This allows, for example, having a charging control software running and a user interface showing a battery bar on the display.

The master PM IC 22 monitors whether it receives such a regular power up command from the system (step 302). If this is the case, the additional power control unit of the master PM IC 22 starts a conventional powering up of the mobile terminal 1 (step 303), which may include a complex state machine. The powering up is not indicated in detail. It makes use of the signal line 13 as well, which ensures that the battery voltage is above the highest cut-off threshold before any functional components 21, 31 are powered up. For the actual powering up, the master PM IC 22 will disable transistor T1, that is, make it not conducting, to activate the enable signal. The master PM IC 22 releases in addition a reset signal. Thereupon, the system processor 10 will boot up, etc.

Figure 4:
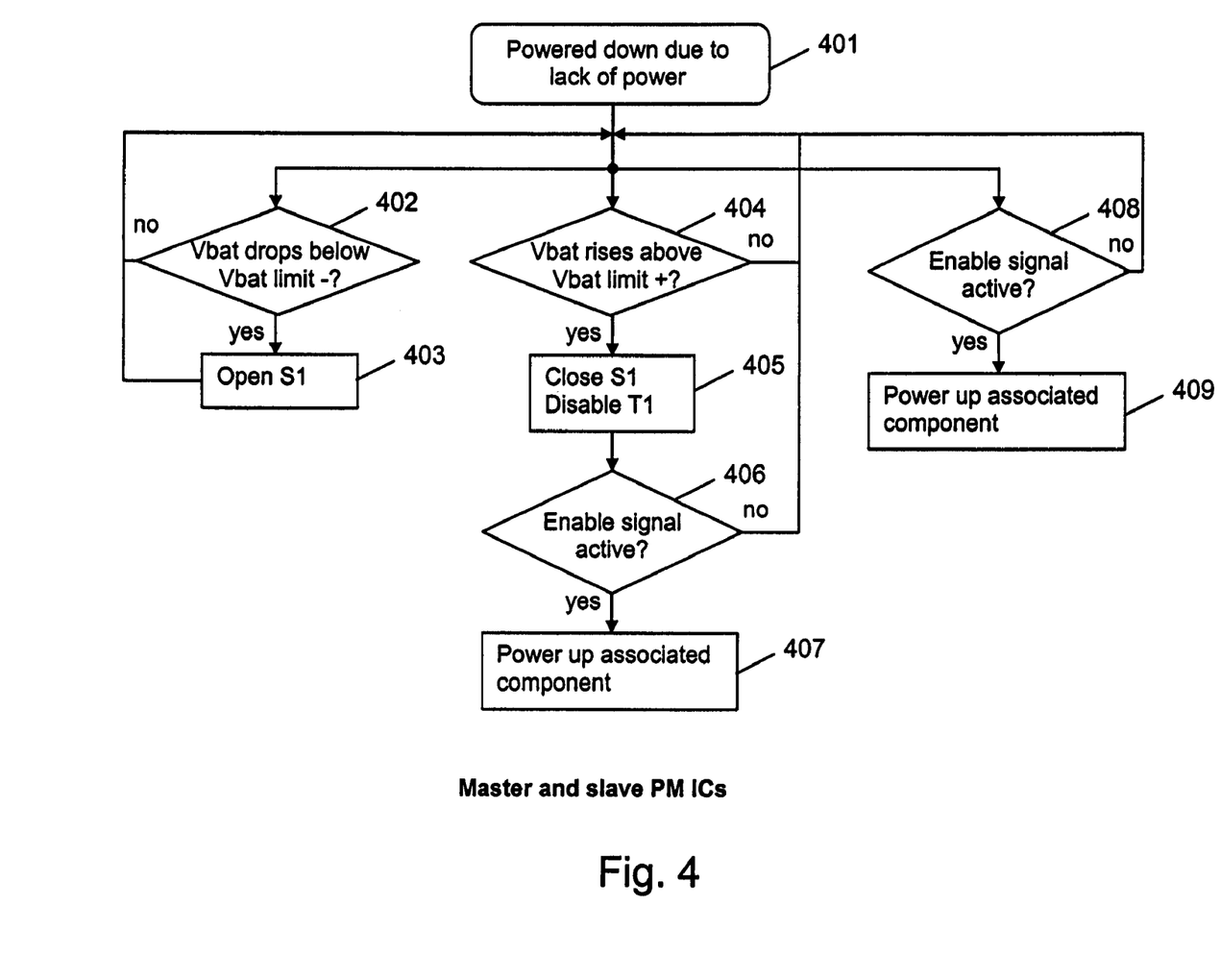
FIG. 4 is a flow chart illustrating operations in the electronic device of FIG. 1 when it is powered down due to a lack of battery power.

FIG. 4 is a flow chart illustrating the operation at any of the PM ICs 22, 32 in case the mobile terminal 1 has been powered down because the battery voltage dropped below the cut-off threshold set for at least one of the PM ICs 22, 32 (step 401).

When only some of the PM ICs 22, 32 have detected a battery voltage below their cut-off threshold before a shutdown, there is some small current consumption via at least one pull-up resistor 27, 37, at least one closed switch S1, S2 and at least one conducting pull-down transistors T1, T2.

Even while the mobile terminal 1 is powered down, all PM ICs 22, 32 therefore monitor whether the battery voltage drops below a respectively set cut-off threshold (step 402). If this is the case, the respective switch S1, S2 is opened and the respective transistor T1, T2 is provided with a high level control signal (step 403). As soon as the battery voltage has dropped below the lowest cut-off threshold, the switches S1, S2 of all PM ICs 22, 32 are disabled and the current flow stops completely. As a result, power is saved.

It has to be noted that, in order to save power, steps 402 and 403 may also be carried out if the mobile terminal 1 has been powered off by the additional power control unit while the voltage battery was above the highest cut-off threshold.

If the mobile terminal 1 had been powered down due to a lack of a sufficient battery voltage, all PM ICs 22, 32 monitor moreover whether the battery voltage rises again above a respectively set power-up threshold (step 404). The reason for such a battery voltage rise may be that the battery 12 had been removed and is now inserted again into the mobile terminal 1, or that a charger is connected to the mobile terminal 1 and is now charging the empty battery 12.

If a first one of the PM ICs 22, 32 detects that the battery voltage rises above the fixed set power-up threshold, the first PM IC 22, 32 automatically closes its switch S1, S2 and disables its transistor T1, T2 as described above (step 405). As a result, the enable signal is activated by a high voltage on the signal line 13, unless any of the other PM ICs 22, 32 causes its transistor T1, T2 to stay conductive.

If the first PM IC 22, 32 detects an enable signal (step 406), its power supply unit 23, 33 powers up the associated functional components 21, 31 (step 407).

If the first PM IC 22, 32 does not detect an active enable signal (step 406), it waits until it detects an enable signal (step 408). The reason for a persistent inactive enable signal may be that the battery voltage did not yet exceed the highest power-up threshold set for one of the other PM ICs 22, 32, at least this other PM IC 22, 32 thus keeping its transistor T1 conducting. As soon as the first PM IC 22, 32 detects an active enable signal (step 408), its power supply unit 23, 33 powers up the associated functional components (step 409).

Equally, the power supply unit 23, 33 of any other PM IC 22, 32, which detects an active enable signal (step 408), powers up the associated functional components (step 409).

Thus, after all PM ICs 22, 32 in the system have closed their switch S1, S2 and disabled their pull-down transistor T1, T2, the enable signal is activated and all functional components of the mobile terminal 1 are powered up. The master PM IC 22 outputs in addition a "power up reset" signal as the system reset.

Figure 5:
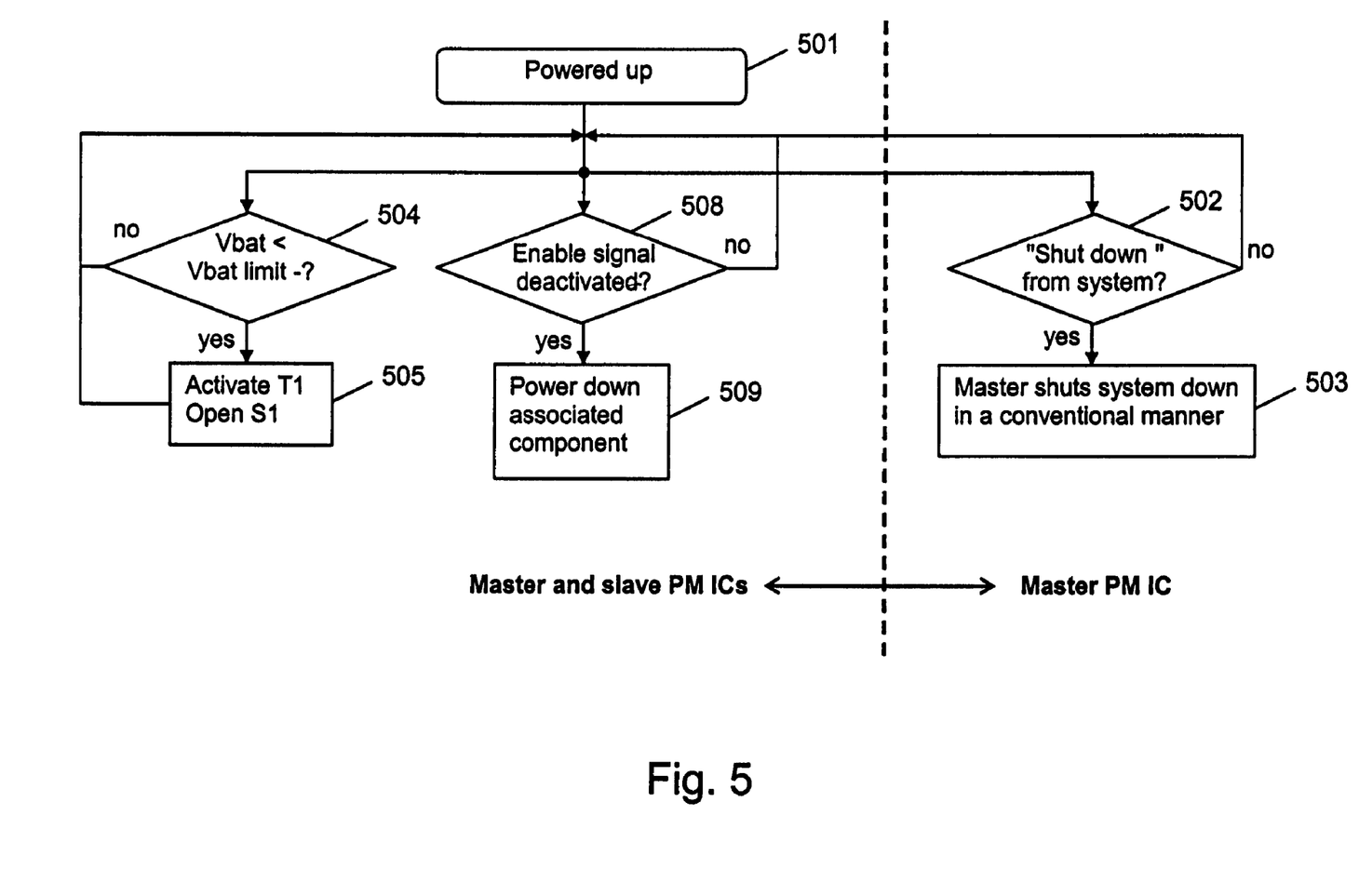
FIG. 5 is a flow chart illustrating operations in the electronic device of FIG. 1 when it is powered up.

FIG. 5 is a flow chart illustrating the operation in case the mobile terminal 1 is powered up at a starting point (step 501). On the right hand side of a vertical, dashed line, again the conventional operation by the master PM IC 22 is indicated, while on the left hand side of the vertical, dashed line, operations performed by any of the PM ICs 22, 32 is illustrated.

The master PM IC 22 monitors whether it receives a power down command from the system processor 10, for example because the user pressed the ON/OFF button 11 (step 502). If this is the case, the additional power control unit of the master PM IC 22 powers the system down (step 503), including deactivating the associated functional components 21 and activating the pull-down transistor T1 for deactivating the enable signal. A complex state machine is required for controlling this powering down as in a conventional implementation.

Moreover, the comparators 26, 36 of all PM ICs 22, 32 monitor whether the battery voltage Vbat falls below a respectively set cut-off threshold (step 504). The reason for such a decrease of the battery voltage Vbat may be that the battery 12 is removed as well as a regular power consumption by the components of the mobile terminal 1.

If the comparator 26, 36 of a first one of the PM ICs 22, 32 detects that the battery voltage Vbat fell below a set cut-off threshold, the first PM IC 22, 32 automatically activates its transistor T1, T2 and opens its switch S1, S2 as described above (step 505). The voltage on the signal line 13 drops thereupon to a low value.

Moreover, the power supply unit 23, 33 of each PM ICs 22, 32 constantly monitors whether the enable signal is deactivated (step 508). As soon as the power supply unit 23 of any of the PM ICs 22, 32 detects that the enable signal is deactivated, it powers down the associated functional components (step 509).

Thus, when any of the PM ICs 22, 32 in the mobile terminal 1 detects that the battery voltage Vbat fell below its own cut-off threshold, all PM ICs 22, 32 are caused by the resulting disabled enable signal to power down their associated functional components 21, 31.

Figure 6:
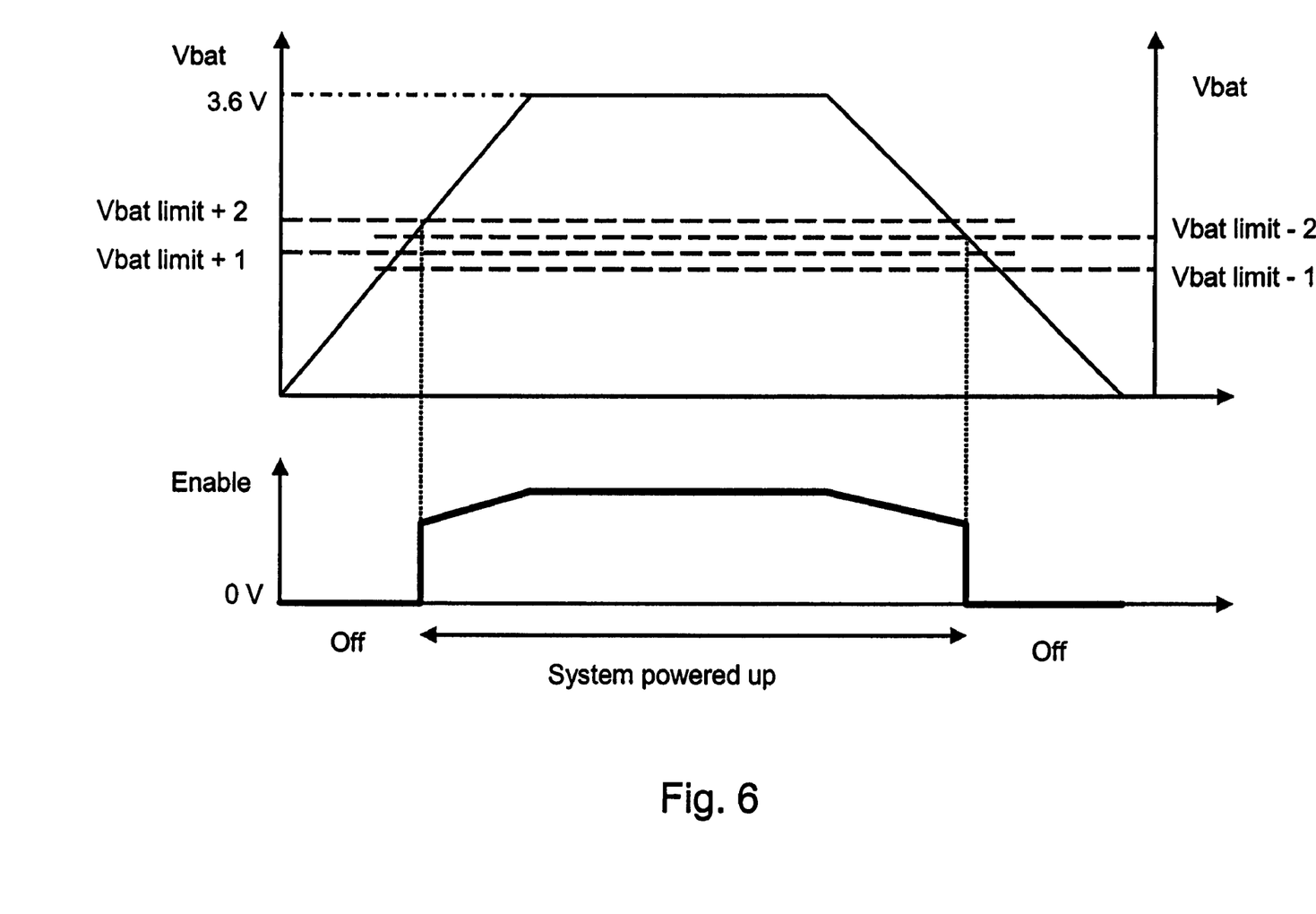
FIG. 6 presents two diagrams illustrating the powering state of the electronic device of FIG. 1 in case of a changing battery voltage.

An exemplary changing of the powering state of the mobile terminal 1 is illustrated in FIG. 6.

FIG. 6 presents at the top a diagram representing the various power up and cut-off limits and their relation to the battery voltage level, and at the bottom a diagram representing the corresponding operating modes, that is, the corresponding voltage level on the enable signal. The diagrams also show the hysteresis related to the limits.

When the battery voltage Vbat rises in the mobile terminal 1 from a low voltage to its nominal voltage, say 3.6 V, for example by charging or by inserting the battery to the device, the battery voltage Vbat passes a cut-off threshold "Vbat limit −1" for a first PM IC 22, a power-up threshold "Vbat limit +1" for the first PM IC 22, a cut-off threshold "Vbat limit −2" for a second PM IC 32, and a power-up threshold "Vbat limit +2" for the second PM IC 32.

Until the battery voltage Vbat reaches the highest power-up threshold "Vbat limit +2", the voltage on the signal line 13, and thus the enable signal, is basically equal to zero and the mobile terminal 1 is kept powered down. When the highest power-up threshold "Vbat limit +2" is passed, the enable signal is activated and the mobile terminal 1 is powered up. The enable signal reaches its highest value when the battery voltage Vbat reaches its maximum voltage.

The battery voltage is then kept high until almost all power has been consumed by the powered up mobile terminal 1, or until the battery has been removed from the device. At this point of time, the battery voltage Vbat starts decreasing, passing the power-up threshold "Vbat limit +2" for the second PM IC 32 and the cut-off threshold "Vbat limit −2" for the second PM IC 32.

As soon as the battery voltage starts to decrease, also the voltage on the signal line starts to decrease. As soon as the highest cut-off threshold "Vbat limit −2" is passed, though, the voltage on the signal line 13 is reduced to zero or at least to close to zero, representing a deactivated enable signal. As soon as the enable signal is deactivated, the mobile terminal 1 is powered down again.

The battery voltage could continue decreasing below the power-up threshold "Vbat limit +1" for the first PM IC 22 and the cut-off threshold "Vbat limit −1" for the first PM IC 22, but the system would stay in power off mode.

The situation is the same if there are more than two PM ICs 1 to n, for which power up thresholds "Vbat limit +1" to "Vbat limit +n" and cut-off thresholds "Vbat limit −1" to "Vbat limit −n" are defined. The PM ICs will not power up until they all consider the battery voltage to be high enough, that is, until Vbat>max (Vbat limit +1, Vbat limit +2, . . . , Vbat limit +n). The system shuts down when Vbat<max (Vbat limit −1, Vbat limit −2, . . . . Vbat limit −n). Thus, the voltage monitoring circuit having the highest cut-off threshold will force all other voltage monitoring circuits to shut down by setting the enable signal inactive.

It should be mentioned that there is an earlier U.S. patent application Ser. No. 10/967,097 filed Oct. 15, 2004 by the same inventor which is hereby incorporated by reference for background.

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An electronic device comprising at least two power management circuits and a signal line connecting said at least two power management circuits;
   wherein each of said at least two power management circuits is adapted to control a power supply to at least one functional component of said electronic device associated to said power management circuit;
   wherein each of said at least two power management circuits is adapted to detect at least one of a condition which allows a change of a powering state of said at least one functional component associated to said power management circuit and a condition which requires a change of a powering state of said at least one functional component associated to said power management circuit;
   wherein each of said at least two power management circuits is adapted to contribute to a change of a state of said signal line, in case said power management circuit detects a condition which allows or requires, respectively, a change of a powering state of said at least one functional component associated to said power management circuit;
   wherein each of said at least two power management circuits is adapted to monitor a state of said signal line, wherein each of said at least two power management circuits is adapted to change a powering state of all functional components associated to it upon detection of a change of state of said signal line, and
   wherein a condition which allows a change of a powering state of said at least one functional component associated to a power management circuit comprises a condition which allows powering up said at least one functional component, and wherein said at least two power management circuits are adapted to change a state of said signal line to cause said at least two power management circuits to power up their associated functional components, in case each of said at least two power management circuits detects a condition which allows powering up associated functional components.

2. The electronic device according to claim 1, wherein one of said at least two power management circuits is a master power management circuit, wherein at least one other of said at least two power management circuits is a slave power management circuit, and wherein said master power management circuit is adapted to control said at least one slave power management circuit.

3. The electronic device according to claim 1, further comprising a battery providing a supply voltage, wherein a condition which allows powering up said at least one functional component associated to one of said power management circuits comprises a battery voltage exceeding a power-up threshold associated to said power management circuit.

4. The electronic device according to claim 1, wherein a condition which requires a change of a powering state of said at least one functional component associated to a power management circuit comprises a condition which requires powering down said at least one functional component, and wherein said at least two power management circuits are adapted to change a state of said signal line to cause said at least two power management circuits to power down their associated functional components, in case at least one of said at least two power management circuits detects a condition which requires a powering down of said at least one associated functional component.

5. The electronic device according to claim 4, further comprising a battery providing a supply voltage, wherein a condition which requires powering down said at least one functional component associated to one of said power management circuits comprises a battery voltage falling short of a cut-off threshold associated to said power management circuit.

6. The electronic device according to claim 1, wherein either of said at least two power management circuits monitors a plurality of conditions which allow or require a change of a powering state of said at least one functional component associated to said power management circuit.

7. The electronic device according to claim 6, wherein one of said plurality of conditions which requires a change of a powering state of said at least one functional component associated to said power management circuit is a temperature exceeding a predetermined limit.

8. The electronic device according to claim 1, wherein said signal line is arranged to carry an open drain type of signal which can be activated by any of said at least two power management circuits.

9. The electronic device according to claim 1, wherein a pull-up resistor is associated to at least one of said at least two power monitoring circuits, and wherein each of said at least two power management circuits is adapted to enable an active state of said signal line by switching an associated pull-up resistor between a power supply and said signal line.

10. The electronic device according to claim 1, wherein each of said at least two power management circuits comprises a switching element, wherein said signal line is connected via said switching element to ground, and wherein each of said at least two power management circuits is adapted cause an inactive state of said signal line by closing said switching element.

11. The electronic device according to claim 10, wherein said switching element is a transistor.

12. The electronic device according to claim 1, wherein at least one of said power management circuits comprises a state machine, which state machine defines a handling of a signal on said signal line.

13. A power management circuit for controlling a power supply to at least one functional component of an electronic device, said power management circuit comprising:
    a signal line terminal enabling a connection to a signal line; and
    a power supply terminal enabling a control of said power supply to said at least one functional component associated to said power management circuit;
    wherein said power management circuit is adapted to detect at least one of a condition which allows a change of a powering state of said at least one functional component and a condition which requires a change of a powering state of said at least one functional component;
    wherein said power management circuit is adapted to contribute to a change of a state of a signal line connected to said signal line terminal, in case said power management circuit detects a condition which allows or requires, respectively, a change of a powering state of said at least one functional component;
    wherein said power management circuit is adapted to monitor a state of a signal line connected to said signal line terminal,
    wherein said power management circuit is adapted to change a powering state of said functional components upon detection of a change of state of a signal line connected to said signal line terminal, and
    wherein a condition which allows a change of a powering state of said at least one functional component associated to said power management circuit comprises a condition which allows powering up said at least one functional component, and wherein said power management circuit is for use as one among at least two power management circuits adapted to change a state of said signal line to cause said at least two power management circuits to power up associated functional components of said electronic device, in case each of said at least two power management circuits detects a condition which allows powering up said associated functional components.

14. A chip comprising at least one functional component and a power management circuit adapted to control a power supply to said at least one functional component of an electronic device,
    wherein said power management circuit is adapted to detect at least one of a condition which allows a change of a powering state of said at least one functional component and a condition which requires a change of a powering state of said at least one functional component;
    wherein said power management circuit is adapted to contribute to a change of a state of a signal line, in case said power management circuit detects a condition which allows or requires, respectively, a change of a powering state of said at least one functional component;
    wherein said power management circuit is adapted to monitor a state of said signal line,
    wherein said power management circuit is adapted to change a powering state of said functional components upon detection of a change of state of said signal line,
    wherein a condition which allows a change of a powering state of said at least one functional component associated to said power management circuit comprises a condition which allows powering up said at least one functional component, and wherein said power management circuit is for use as one among at least two power management circuits are adapted to change a state of said signal line to cause said at least two power management circuits to power up associated functional components of said electronic device, in case each of said at least two power management circuits detects a condition which allows powering up associated functional components.

15. A method for operating an electronic device comprising
    at least two power management circuits and a signal line interconnecting said at least two power management circuits, wherein at least one functional component of said electronic device is associated to each power management circuit of said at least two power management circuits, and wherein each of said at least two power management circuits is adapted to control a power supply to said at least one associated functional component, said method comprising at each of said at least two power management circuits:
    monitoring a state of said signal line,
    monitoring an entry of at least one of a condition which allows a change of a powering state of said at least one functional component associated to said power management circuit and a condition which requires a change of a powering state of said at least one functional component associated to said power management circuit,
    contributing to a change of a state of said signal line, in case a condition which allows or requires, respectively, a change of a powering state of said at least one functional component associated to said power management circuit is detected,
    changing a powering state of said at least one functional component associated to said power management circuit upon detection of a change of state of said signal line, and
    wherein a condition which allows a change of a powering state of said at least one functional component associated to said power management circuit comprises a condition which allows powering up said at least one functional component, and
    wherein said at least two power management circuits are adapted to change a state of said signal line to cause said at least two power management circuits to power up their associated functional components, in case each of said at least two power management circuits detects a condition which allows powering up associated functional components.

16. The electronic device according to claim 13, wherein a condition which requires a change of a powering state of said at least one functional component associated to a power management circuit comprises a condition which requires powering down said at least one functional component, and wherein said at least two power management circuits are adapted to change a state of said signal line to cause said at least two power management circuits to power down their associated functional components, in case at least one of said at least two power management circuits detects a condition which requires a powering down of said at least one associated functional component.

17. The electronic device according to claim 14, wherein a condition which requires a change of a powering state of said at least one functional component associated to a power management circuit comprises a condition which requires powering down said at least one functional component, and wherein said at least two power management circuits are adapted to change a state of said signal line to cause said at least two power management circuits to power down their associated functional components, in case at least one of said at least two power management circuits detects a condition which requires a powering down of said at least one associated functional component.

18. The electronic device according to claim 15, wherein a condition which requires a change of a powering state of said at least one functional component associated to a power management circuit comprises a condition which requires powering down said at least one functional component, and wherein said at least two power management circuits are adapted to change a state of said signal line to cause said at least two power management circuits to power down their associated functional components, in case at least one of said at least two power management circuits detects a condition which requires a powering down of said at least one associated functional component.

19. The electronic device according to claim 13, further comprising a battery providing a supply voltage, wherein a condition which allows powering up said at least one functional component associated to one of said power management circuits comprises a battery voltage exceeding a power-up threshold associated to said power management circuit.

20. The electronic device according to claim 14, further comprising a battery providing a supply voltage, wherein a condition which allows powering up said at least one functional component associated to one of said power management circuits comprises a battery voltage exceeding a power-up threshold associated to said power management circuit.

21. The electronic device according to claim 15, further comprising a battery providing a supply voltage, wherein a condition which allows powering up said at least one functional component associated to one of said power management circuits comprises a battery voltage exceeding a power-up threshold associated to said power management circuit.

22. The electronic device according to claim 13, further comprising a battery providing a supply voltage, wherein a condition which requires powering down said at least one functional component associated to one of said power management circuits comprises a battery voltage falling short of a cut-off threshold associated to said power management circuit.

23. The electronic device according to claim 14, further comprising a battery providing a supply voltage, wherein a condition which requires powering down said at least one functional component associated to one of said power management circuits comprises a battery voltage falling short of a cut-off threshold associated to said power management circuit.

24. The electronic device according to claim 15, further comprising a battery providing a supply voltage, wherein a condition which requires powering down said at least one functional component associated to one of said power management circuits comprises a battery voltage falling short of a cut-off threshold associated to said power management circuit.

* * * * *